(No Model.)
W. F. KORNEMANN.
EYEGLASSES.
No. 521,933.  Patented June 26, 1894.
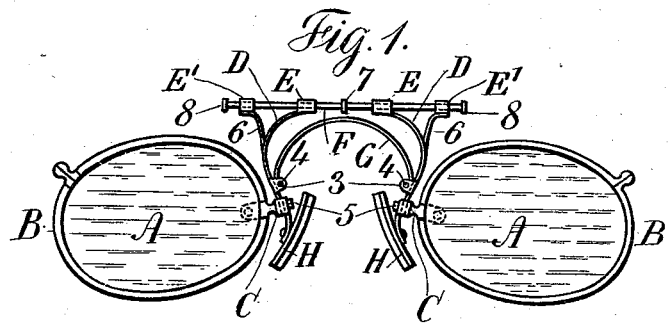
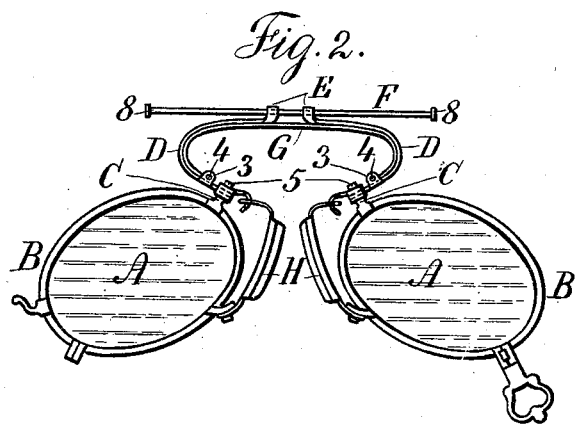
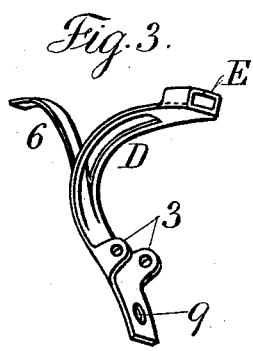
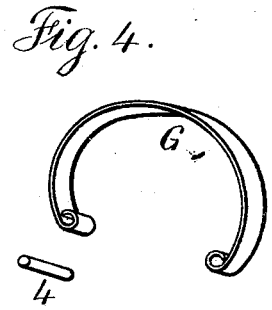
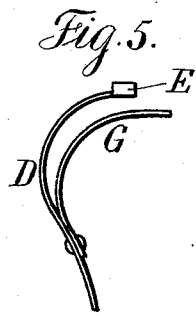
Witnesses:
J. Staib
H. M. Oliver
Inventor:
W. F. Kornemann
By Geo. T. Pinckney
Attorney

UNITED STATES PATENT OFFICE.

WILLIAM FREDK. KORNEMANN, OF NEW YORK, N. Y.

EYEGLASSES.

SPECIFICATION forming part of Letters Patent No. 521,933, dated June 26, 1894.

Application filed October 20, 1893. Serial No. 488,692. (No model.)

*To all whom it may concern:*

Be it known that I, WILLIAM FREDK. KORNEMANN, a subject of the Emperor of Germany, residing at the city of New York, in the county of New York and State of New York, have invented an Improvement in Eyeglasses, of which the following is a full, clear, and exact specification.

The object of my invention is to provide a spring bar bridge for eyeglasses by which the lenses will be maintained in the same vertical plane when in use, and which bridge will not require any special construction of lens frame, but can be readily attached to any style or character of eyeglasses, whether the lenses are provided with frames or not.

In the accompanying drawings:—Figure 1. is a front view of a pair of eyeglasses, showing my improvement. Fig. 2. shows a modification of the same. Fig. 3. shows in perspective, how each one of the side bars with the ears, guide sleeve and branch arm may be made out of one piece. Fig. 4. shows in perspective the bowed spring and its hinge connection with one of the side bars, and Fig. 5. illustrates a rigid connection of the spring with one of the side bars.

The parts represented in Figs. 3. 4. and 5. are shown in enlarged size.

A. A, are the lenses; B. B, the lens frames, and C. C, are posts secured to the lenses or their frames in any well known or desired manner.

D. D, are side bars, each having at its upper end a guide sleeve E, through which passes a bar or pin F. This bar F. is headed at each end and is adapted to slide in the sleeves E. The heads 8. at the ends of the bar F. prevent the ends of the bar slipping through the sleeves E.

The upper portion of each side-bar D, is preferably curved to conform to the shape of the bowed spring G. so that when such spring is contracted, the curved portions of the side-bars fit closely upon the top surface of the bowed spring, as shown in Fig. 2.

In Fig. 1, the lenses are shown drawn slightly away from each other as when upon the nose of a person.

I prefer to employ branch arms 6. as shown in Fig. 1. which may be united to the side-bars D. by welding or soldering, or such branch arms 6. may be cut out of the metal of which the side bars are formed, and bent up to the desired shape as shown in Fig. 3. Upon the free end of each of these branch arms 6. is a guide sleeve E', attached to the branch arms preferably by soldering. The bar F, also passes through these sleeves E', and is adapted to slide therein. I prefer to make the bar or pin F. of thin flat metal, with squared edges, but the same may be made of any suitable material and shape. I also prefer to provide one or more ribs or stops 7. at or near the center of the bar or pin F. as shown in Fig. 1. against which the sleeves E, take so as to bring the pin in an even position relative to the other parts when the spring is contracted.

As shown in Fig. 3, each one of the side bars with its sleeve E, ears 3, and branch arm 6, may be cut out of one piece of metal, in which case the branch arms 6, and ears 3, are bent up to the desired shape, and the sleeve E, formed by bending the pieces of metal cut out for that purpose, over so that their ends meet or overlap each other. A hole 9, is made through each of the side bars near their lower ends to allow such side bars to be secured to the posts C. C, by the screws 5.

The side bars D. D, are connected by a spring G, the ends of which spring are attached to the respective side bars preferably above the point at which the side-bars are attached to the posts C, C. The ends of the spring G, may be rigidly secured to the side bars as seen in Fig. 5, but I prefer to use a pivotal or hinge connection as shown in Fig. 4. This hinge attachment is made by forming a barrel at each end of the spring G. and providing ears or lugs 3, on the edges of the side bars with holes through such ears, and attaching the spring to the side bars by pins or rivets 4, which pass through such holes in the ears 3, and through the barrels at the ends of the bowed spring.

The nose-pieces H, may be of any well known or desired character, and can be attached to the posts C. C by the same screws that secure the side bars to such posts, as shown.

It will be readily understood that my improved spring-bar bridge can easily be attached to any kind of eyeglasses, because no special construction of lens frame is necessary, my improvement being adapted to being attached to the posts only, and it can be applied as readily to eyeglasses when no frame is around the lenses, the posts being secured to the lenses themselves as shown by dotted lines in Fig. 1, or in any well known manner.

I claim as my invention—

1. A bridge for eyeglasses, consisting of two side bars joined together by a spring, the ends of which are pivotally connected to the side bars, said side bars having guide sleeves at their upper ends, and their lower ends fastened to posts secured to the lenses or their frames, and a bar having a stop at each end and adapted to slide in the guide sleeves substantially as specified.

2. In eyeglasses, a bridge, consisting of two side bars joined together by a spring, the ends of which are fastened to the side bars, said side bars having guide sleeves at their upper ends and a bar having a head or stop at each end and sliding in the guide sleeves, the lower end of each side bar having a hole through it by which it is to be attached by a screw to the posts secured to the lenses or their frames, substantially as specified.

3. In eyeglasses, a bridge, consisting of two side bars joined together by a spring, the ends of which are fastened to the side bars, guide sleeves on the upper ends of the side bars, a bar having a head at each end and a rib or stop at or near its center, said bar being adapted to slide in the guide sleeves, the lower end of each side bar having a hole through it to allow it to be attached to the posts upon the lenses or their frames by means of a screw, substantially as specified.

4. In eyeglasses, a bridge consisting of two side bars joined together by a spring, the ends of which are fastened to the side bars, the lower ends of the side bars being secured to posts on the lenses or their frames, guide sleeves on the upper ends of the side bars, a branch arm upon each side bar and a guide sleeve on the free end of each branch arm, a bar passing through the guide sleeves on the side bars and branch arms, such bar having a head or stop at each end, substantially as specified.

5. In eyeglasses, a bridge consisting of two side bars joined together by a spring, the ends of which are secured to the side bars, the lower ends of the side bars being attached to posts on the lenses or their frames, guide sleeves on the upper ends of the side bars, a branch arm upon each side bar and a guide sleeve on the free end of each branch arm, a bar passing through the guide sleeves on the side bars and branch arms, such bar having a head at each end and a rib or stop on its surface at or near its center, substantially as specified.

6. A spring bar bridge for eyeglasses for maintaining the lenses in the same vertical plane, consisting of two side bars joined together by a bowed spring the ends of which are hinged to the side bars, the upper portion of each side bar being curved to conform to the shape of the bowed spring, and each side bar having a hole through it near the lower end to allow it to be attached by a screw to the posts upon the lenses or their frames, guide sleeves upon the upper ends of the side bars, and a headed bar sliding in the guide sleeves, substantially as specified.

7. In eyeglasses, the combination with a pair of lenses, of two side bars joined together by a bowed spring having a barrel at each end and connected to lugs on the side bars by pins which pass through holes in the lugs and through the barrels at the ends of the spring, each side bar having its upper portion curved to conform to the shape of the bowed spring, the lower ends of the side bars being attached to posts secured to the lenses or their frames, guide sleeves at the upper ends of the side bars and a headed bar sliding in the guide sleeves, substantially as specified.

8. In eyeglasses, the combination with a pair of lenses, of two side bars joined together by a bowed spring having a barrel at each end and connected to lugs on the side bars by pins passed through holes in the lugs and through the barrels at the ends of the spring, the lower ends of the side bars being attached to posts secured to the lenses or their frames, a branch arm upon each side bar, guide sleeves upon the upper ends of the side bars and on the free ends of the branch arms, and a bar passing through such guide sleeves, said bar having a head or stop on each end, substantially as specified.

9. In eyeglasses, the combination with a pair of lenses, of two side bars joined together by a bowed spring having a barrel at each end and connected to lugs on the side bars by pins passed through holes in the lugs and through the barrels at the ends of the spring, the lower ends of the side bars being attached to posts secured to the lenses or their frames, a branch arm upon each side bar, guide sleeves upon the upper ends of the side bars and on the free ends of the branch arms, a bar headed at each end and passing through such guide sleeves, and the nose pieces, substantially as specified.

Signed by me this 18th day of October, 1893.

WM. FREDK. KORNEMANN.

Witnesses:
 GEO. T. PINCKNEY,
 A. M. OLIVER.